(12) United States Patent
Kawamura et al.

(10) Patent No.: US 7,010,650 B2
(45) Date of Patent: Mar. 7, 2006

(54) MULTIPLE DATA MANAGEMENT METHOD, COMPUTER AND STORAGE DEVICE THEREFOR

(75) Inventors: Yoshitaka Kawamura, Yokohama (JP); Masaharu Iwanaga, Kamakura (JP); Satoshi Miyazaki, Yamato (JP); Naoki Hino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 388 days.

(21) Appl. No.: 10/442,724

(22) Filed: May 20, 2003

(65) Prior Publication Data

US 2004/0236915 A1   Nov. 25, 2004

(51) Int. Cl.
G06F 12/00 (2006.01)

(52) U.S. Cl. ...................... 711/154; 711/162
(58) Field of Classification Search ................ 711/162, 711/161, 154; 714/100, 1, 2, 6, 11
See application file for complete search history.

(56) References Cited

U.S. PATENT DOCUMENTS

| | | | |
|---|---|---|---|
| 5,155,845 A | 10/1992 | Beal et al. | |
| 5,398,331 A | 3/1995 | Huang et al. | |
| 5,689,706 A * | 11/1997 | Rao et al. | 707/201 |
| 5,720,029 A | 2/1998 | Kern et al. | |
| 5,742,792 A | 4/1998 | Yanai et al. | |
| 6,282,610 B1 | 8/2001 | Bergsten | |
| 6,301,643 B1 | 10/2001 | Crockett et al. | |
| 6,502,205 B1 | 12/2002 | Yanai et al. | |
| 6,907,507 B1 * | 6/2005 | Kiselev et al. | 711/162 |

2003/0217119 A1   11/2003   Raman et al.

FOREIGN PATENT DOCUMENTS

| | | |
|---|---|---|
| EP | 1298530 A1 | 4/2003 |
| JP | 09-325917 | 12/1997 |
| JP | 10-333833 | 12/1998 |
| JP | 2003-157189 | 5/2003 |

OTHER PUBLICATIONS

Bhide et al "An Efficient Scheme for Providing High Availability," Proceedings of the 1992 ACM SIGMOD International Conference on Management of Data 21:236-245 (1992).

King et al. "Management of a Remote Backup Copy for Disaster Recovery," ACM Transactions on Database Systems 16:338-368 (1991).

* cited by examiner

Primary Examiner—Kimberly McLean-Mayo
(74) Attorney, Agent, or Firm—Townsend and Townsend and Crew LLP (57) ABSTRACT

A host computer and primary and secondary storage devices are connected as capable of communicating with each other via a network, the primary and secondary storage devices functioning as data storage means of the host computer. The host computer transmits data to be written and a write request Wa to the primary storage device in writing of data into the primary storage device and transmits the data to be written and a write request Wb to the secondary storage device at any point in time after the foregoing transmission. The primary storage device receives the write request Wa and stores the data to be written. The secondary storage device receives the write request Wb and stores the data to be written.

20 Claims, 7 Drawing Sheets

DATA STRUCTURE OF WRITE REQUEST Wa, Wb

FIG. 6

DATA STRUCTURE OF READ REQUEST R

MULTIPLE DATA MANAGEMENT METHOD, COMPUTER AND STORAGE DEVICE THEREFOR

BACKGROUND OF THE INVENTION

1. Field of the Invention

The present invention relates to a multiple data management method carried out in a system in which a host computer and primary and secondary storage devices are connected as capable of communicating with each other via a network, the primary and secondary storage devices functioning as a data storage device of the host computer. Particularly, the present invention relates to a multiple data management method utilizing the Internet as the network.

2. Description of the Related Art

For example, in Japanese Patent Application Laid-open Publication No. Hei10-333838, a multiple data storage system is disclosed, in which data of a first storage subsystem is managed in parallel also in a second storage subsystem connected thereto via a dedicated line or the like for the purpose of securing data integrity and the like in the event such as a disaster. Moreover, in the publication, a synchronous method and an a synchronous method are disclosed as operational methods for the multiplexing storage system. Specifically, the synchronous method is one for maintaining synchronism of primary and secondary storage devices. The a synchronous method is for reducing a waiting time of a host computer in such a manner that, regardless of whether or not writing of data at the secondary storage device is completed, a completion report is immediately transmitted to the host computer when writing of data at the primary storage device is completed.

Moreover, for example, in Japanese Patent Application Laid-open Publication No. Hei9-325917, disclosed is a technology utilized in an operation by the asynchronous method among the operational methods disclosed in the above-described publication. Specifically, by use of the technology, in the case where a primary storage device is down because of a disaster and the like during the time when update states of the primary storage device and an secondary storage device are inconsistent with each other, the secondary storage device grasps the presence/absence of erased data at the secondary storage device side and the data is restored.

Incidentally, as to a technology of multiple data management of a primary storage device by a remote secondary storage device, various technologies have hitherto existed such as the one described above. Recently, with the spread of the Internet, an environment in which the Internet can be utilized easily and inexpensively at various locations has been completed. Thus, it is anticipated that, in the years ahead, there will be increasing cases of utilizing the Internet as a network connecting the primary and secondary storage devices, a computer using those devices and the like. Moreover, it is also anticipated that, from now on, there will be more cases of multiple data management in a personal computer and the like by use of remote storage devices connected via the Internet.

However, the Internet has characteristics different from those of a dedicated line and the like in view of its nature of having its midway routes operated by the general public (for more detail as to such characteristics of the Internet, refer to RFC 791 "INTERNET PROTOCOL," for example). In order to construct a multiple data management system utilizing the Internet as communication means, a mechanism that takes into account such characteristics of the Internet is necessary.

SUMMARY OF THE INVENTION

The present invention was made from the viewpoint as described above. One object of the present invention is to provide a new multiple data management method utilizing the Internet as a network connecting primary and secondary storage devices, a computer using those devices and the like, and to provide the computer and storage devices, which are used therefor.

A major aspect of the present invention for achieving the above and other objects is a multiple data management method in a system in which a host computer and primary and secondary storage devices are connected as capable of communicating with each other via a network, the primary and secondary storage devices functioning as a data storage device of the host computer. The method comprises transmitting, by the host computer, data to be written and a write request Wa to the primary storage device in writing of data into the primary storage device and transmitting, by the host computer, the data to be written and a write request Wb to the secondary storage device at any point in time after the foregoing transmission, receiving the write request Wa and storing the data to be written by the primary storage device, and receiving the write request Wb and storing the data to be written by the secondary storage device.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

Figure 1:
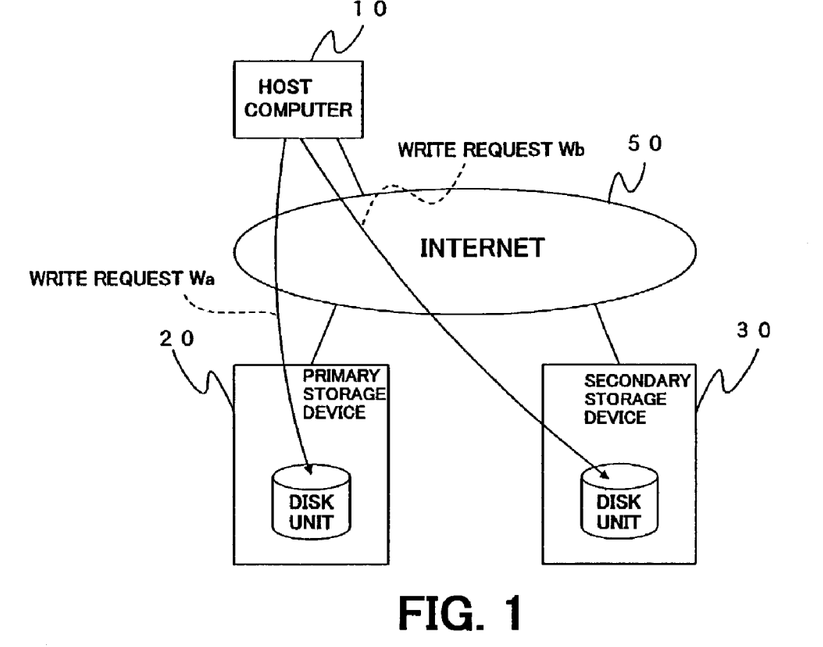
FIG. 1 is a schematic view of a system configuration explaining a multiple data management method of the present invention.

FIG. 1 shows a schematic system configuration explaining a multiple data management method of the present invention. A host computer 10, a primary storage device 20 and a secondary storage device 30 are connected to the Internet 50, the primary and secondary storage devices functioning as a data storage device of the host computer 10.

Figure 2:
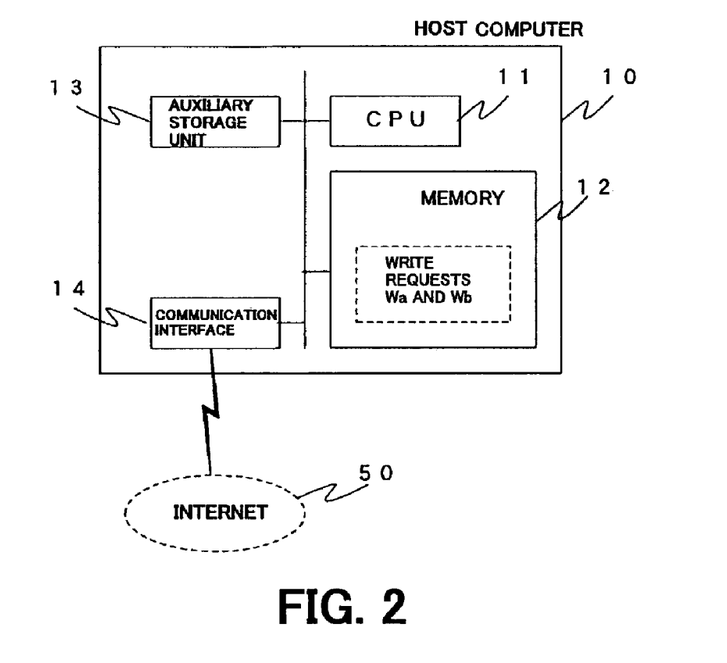
FIG. 2 is a schematic view showing a hardware configuration of a host computer according to one embodiment of the present invention.

FIG. 2 shows a schematic hardware configuration of the host computer 10. The host computer 10 is a computer such as a personal computer and a mainframe, and includes a CPU 11, a memory 12; an auxiliary storage unit 13, a communication interface 14 for connecting the host computer 10 to the Internet 50, and the like. In the host computer 10, an OS (Operating System) is running on the host computer 10 and application programs are operated on this OS.

Figure 3:
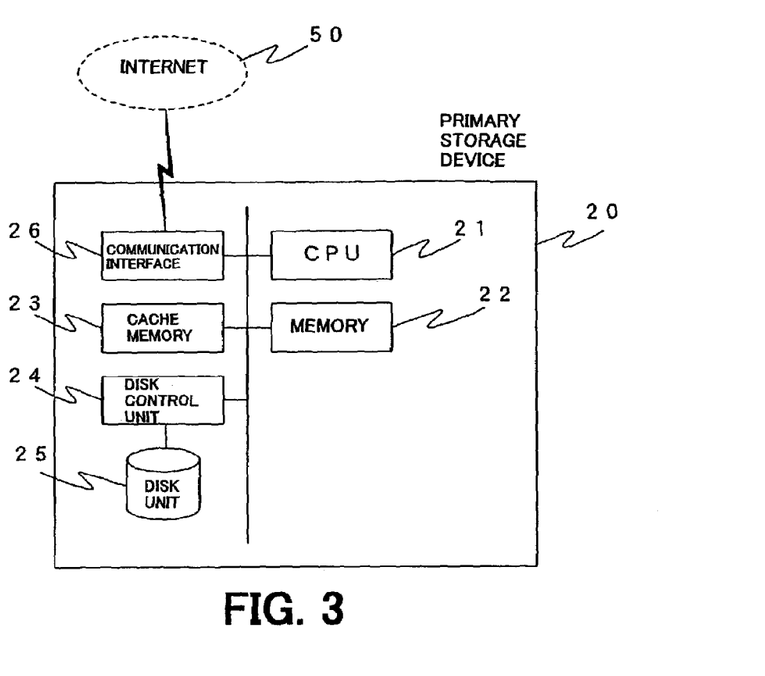
FIG. 3 is a schematic view showing a hardware configuration of a primary storage device according to one embodiment of the present invention.

FIG. 3 shows a schematic hardware configuration of the primary storage device 20. The primary storage device 20 includes a CPU 21, a memory 22, a cache memory 23, a disk control unit 24, a disk unit 25, a communication interface 26 for connecting the primary storage device 20 to the Internet 50, and the like. In the primary storage device 20, microprograms that provide various functions of the primary storage device 20 are operated.

Figure 4:
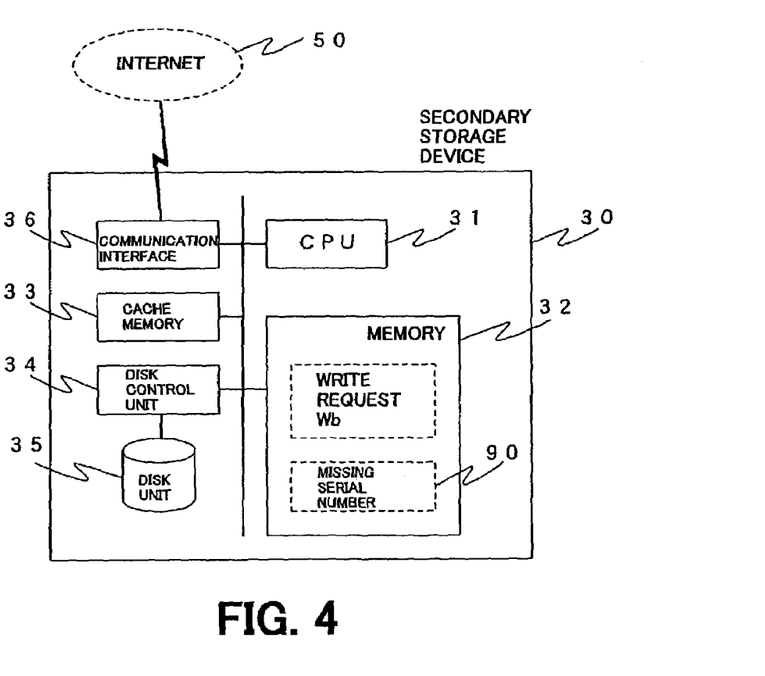
FIG. 4 is a schematic view showing a hardware configuration of a secondary storage device according to one embodiment of the present invention.

FIG. 4 shows a schematic hardware configuration of the secondary storage device 30. The secondary storage device 30 includes a CPU 31, a memory 32, a cache memory 33, a disk control unit 34, a disk unit 35, a communication interface 36 for connecting the secondary storage device 30 to the Internet 50, and the like. In the secondary storage device 30, microprograms that provide various functions of the secondary storage device 30 are operated.

<Write and Read Processes>

A function related to writing of data from the host computer 10 into the primary and secondary storage devices 20 and 30 is provided primarily by the OS operated in the host computer 10.

Figure 5:
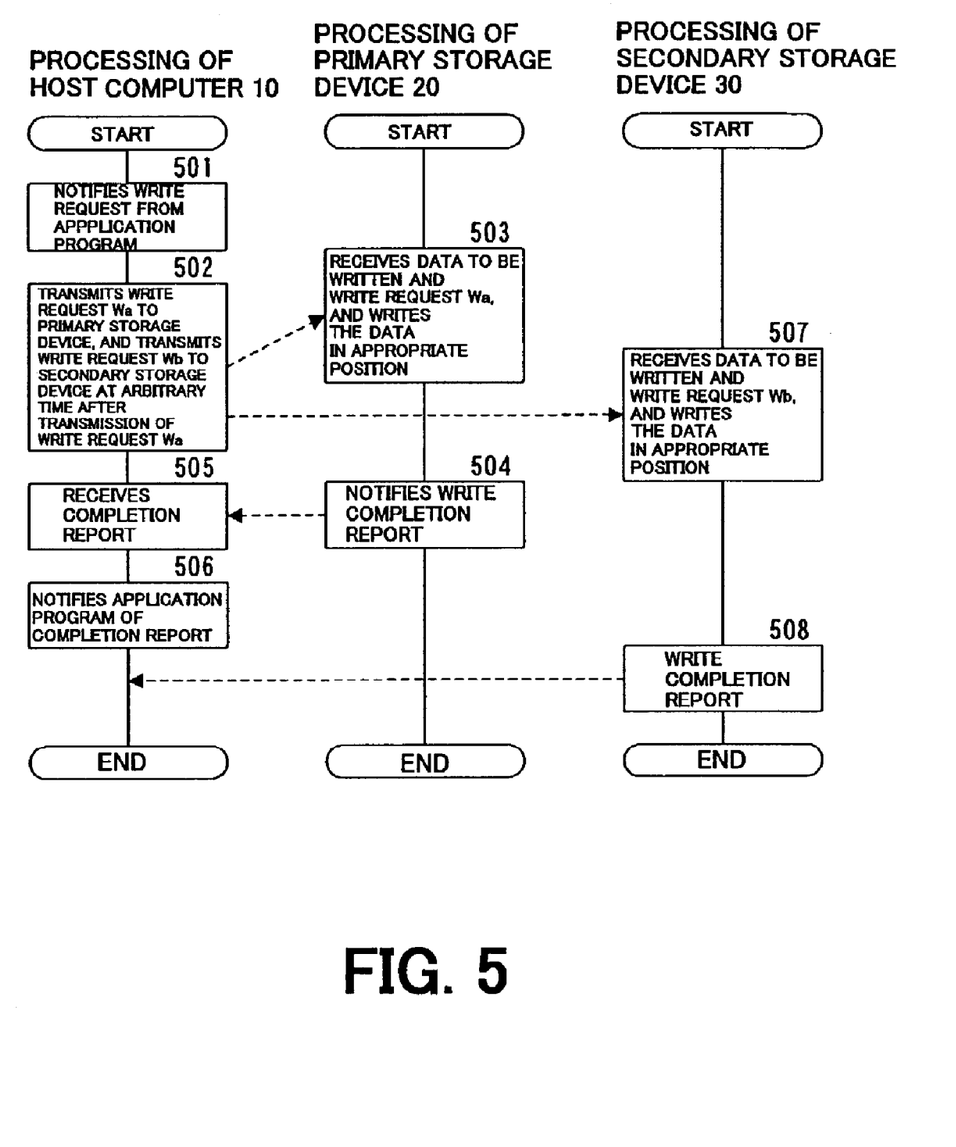
FIG. 5 is a flowchart illustrating data write processing according to one embodiment of the present invention.

FIG. 5 is a flowchart illustrating processing of writing data from the host computer 10 into the primary and secondary storage devices 20 and 30. When a data write request to the primary storage device 20 is notified from an application program (501), the OS transmits a data write request Wa to the primary storage device 20 and, at an arbitrary time after this transmission, transmits a data write request Wb to the secondary storage device 30 (502).

Figure 6:
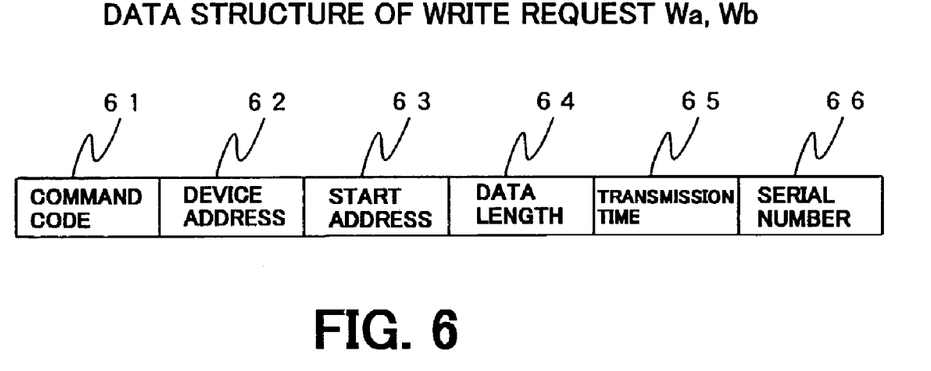
FIG. 6 is a view showing a data structure of a write request according to one embodiment of the present invention.

FIG. 6 shows a data structure of the write requests Wa and Wb. In each of the write requests Wa and Wb, included are: a command code 61 corresponding to a write command, a device address 62 specifying a disk unit to be a write object, a start address 63 specifying a write position, a data length 64 of data to be written, a transmission time 65 that indicates the time of transmitting this request from the host computer 10, a serial number 66 given in the order of transmissions of the respective write requests Wa and Wb, and the like. Note that the transmission time 65 may be also used as the serial number 66.

Upon receipt of the write request Wa, the primary storage device 20 writes the data to be written received with the request in a position specified by the device address and the start address (503) and then transmits a write completion report to the host computer 10 (504). When the host computer 10 receives the completion report (505), the OS notifies the application program to that effect (506). Accordingly, the application program recognizes that the writing of the data to be written is finished. Thereafter, the application program continues its processing regardless of whether or not writing of the data to be written in the secondary storage device 30 is completed.

Meanwhile, upon receipt of the write request Wb, the secondary storage device 30 writes the data to be written received with the request in a position specified by the device address and the start address (507) and then transmits a write completion report to the host computer 10 (508). When the host computer 10 receives the completion report, the OS completes the write processing.

Note that, in the above description, the data to be written is transmitted, while being attached to the data write request Wb, to the secondary storage device 30 at the same time as the data write request Wb. However, it is also satisfactory that only the data write request Wb is transmitted to the secondary storage device 30 in advance and the data to be written is transmitted to the secondary storage device 30 at any point in time after the transmission of the request. Thus, influences of the transmission processing of the data to be written on a processing speed of the application program are suppressed.

Figure 7:
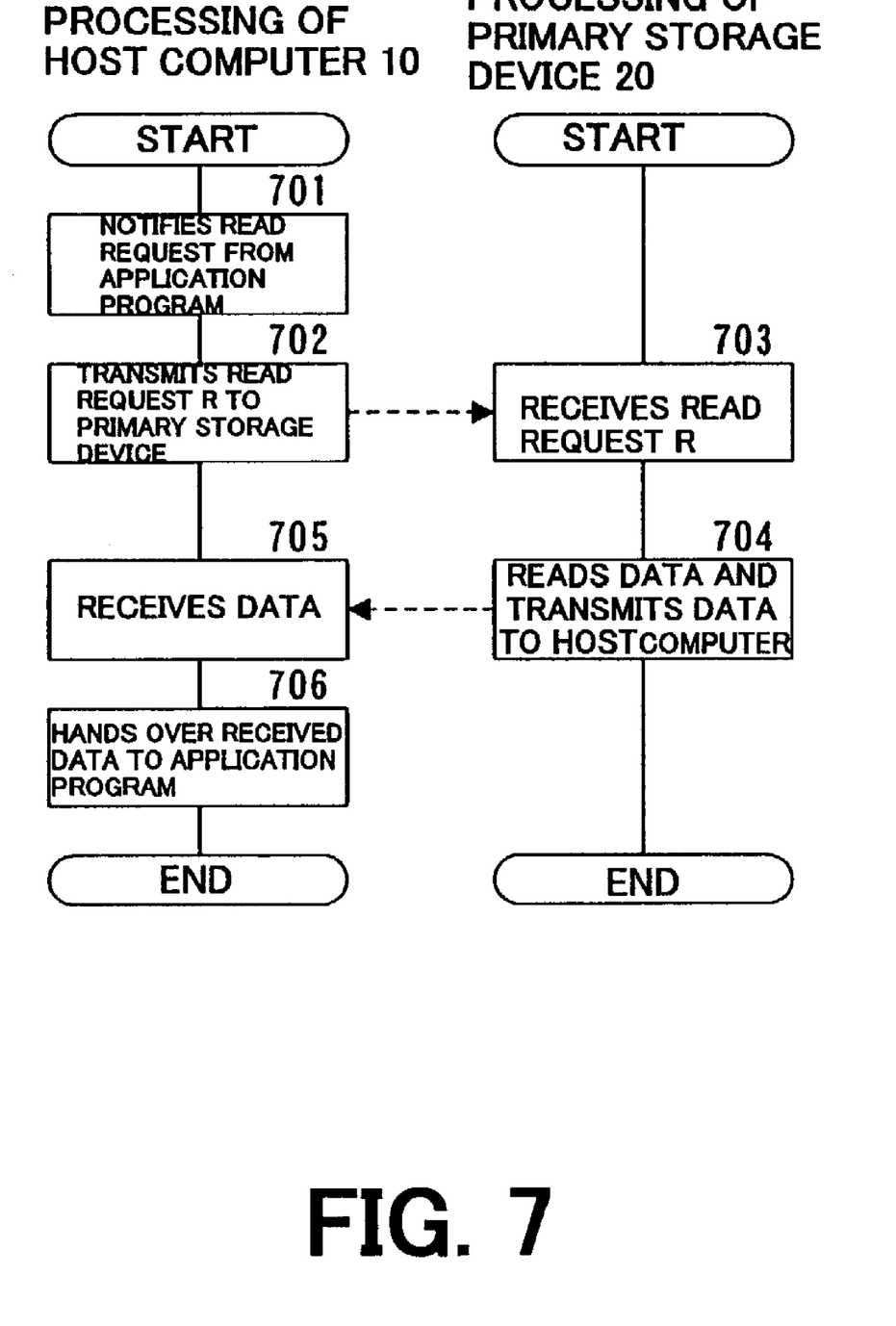
FIG. 7 is a flowchart illustrating data read processing according to one embodiment of the present invention.

FIG. 7 is a flowchart illustrating processing of the host computer 10 reading data from the primary storage device 20. First, when a data read request to the primary storage device 20 is notified from an application program (701), the OS transmits a read request R to the primary storage device 20 (702).

Figure 8:
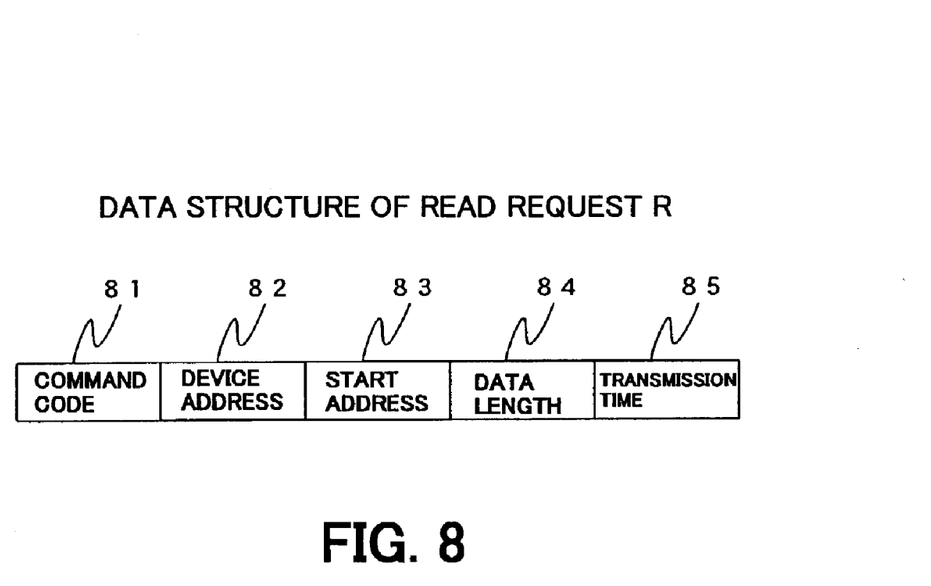
FIG. 8 is a view showing a data structure of a read request according to one embodiment of the present invention.

FIG. 8 shows a data structure of the read request R. As shown in FIG. 8, in the read request R, included are a command code 81 corresponding to a read command, a device address 82 specifying the disk unit 25 storing data to be a read object, a start address 83 indicating a read position, a data length 84 of read object data, a transmission time 85 of this read request R, and the like.

Upon receipt of the read request R (703), the primary storage device 20 reads data specified by the device address 82, the start address 83 and the data length 84, all of which are attached to the request, and transmits the data to the host computer 10 (704). Upon receipt of the read object data (705), the OS of the host computer 10 hands the read object data over to the application program (706). In the above-described manner, the data read processing is completed.

<Compensation for Missing Data>

Incidentally, because of its nature of having its midway routes operated by the general public, the Internet has a higher possibility that data transmitted therethrough does not reach its destination than the dedicated line and the like. Therefore, in the case of utilizing the Internet 50 as a communication medium between the host computer 10 and the primary and secondary storage devices 20 and 30 as in the above-described multiple data management system, there is a possibility that the data write requests Wa and Wb transmitted from the host computer 10 do not reach the primary storage device 20 or the secondary storage device 30.

Here, when the data write request Wa does not reach the primary storage device 20, this data write request Wa is reported as a time-out error by the OS and the application program usually instructs the OS and the like to process resending a write command about that data. Thus, it is less likely that the application program continues the processing without recognizing that the data is not written in the primary storage device 20. Therefore, it is considered that missing data is less likely to occur in the data stored and controlled in the primary storage device 20.

Meanwhile, in consideration of influences on the processing speed of the application program, the processing for the write request Wb to the secondary storage device 30 is usually considered to be often operated by a mechanism in which the processing is executed only by the OS without the application program involved therein. When the write request Wb does not reach the secondary storage device 30, there is a possibility that missing data occurs in the secondary storage device 30. Thus, the multiple data management system in this embodiment includes a mechanism of compensating for missing data in the secondary storage device 30. This mechanism will be described in detail below along with a flowchart shown in FIG. 9.

Figure 9:
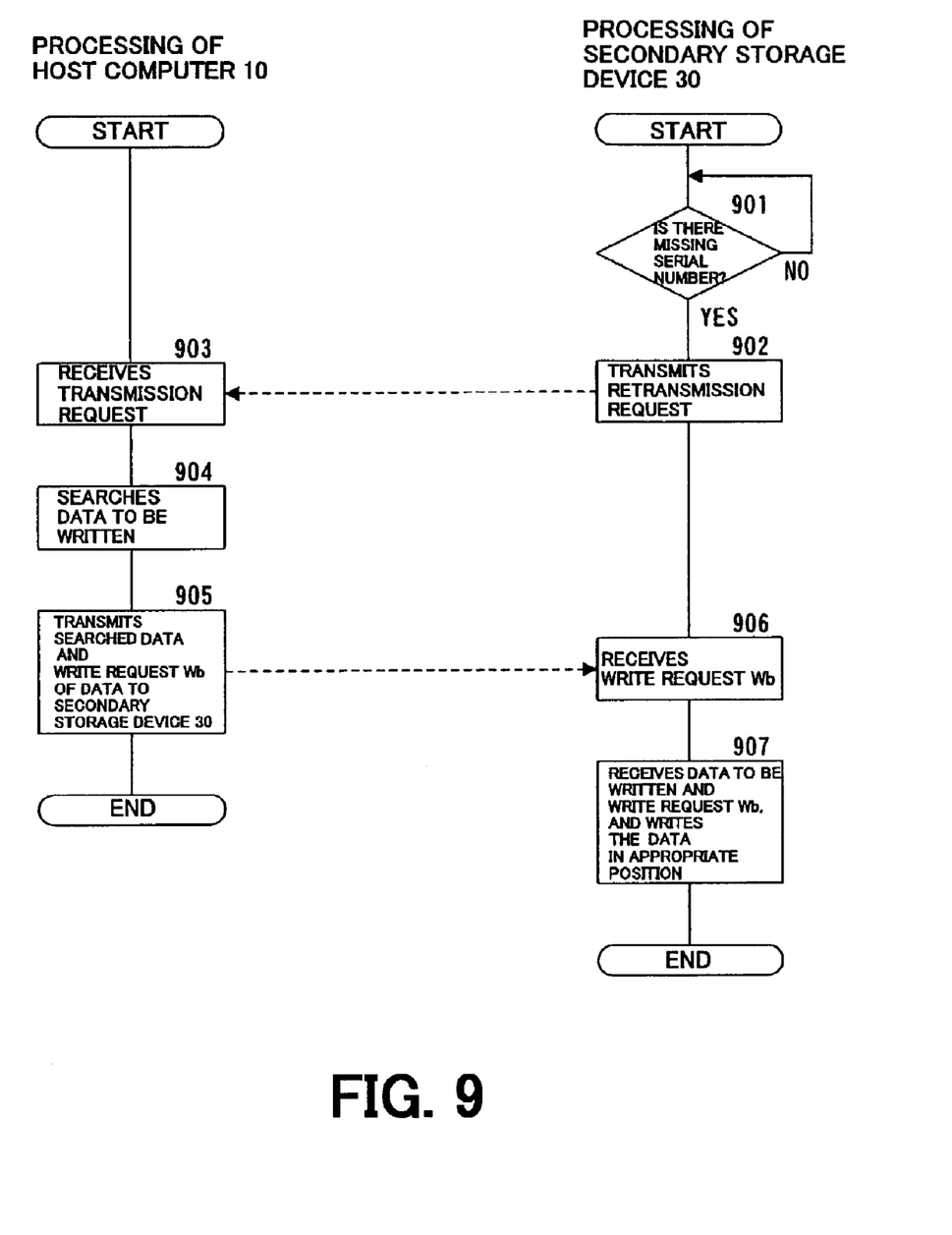
FIG. 9 is a flowchart illustrating processing of compensating for missing data according to one embodiment of the present invention.

The host computer 10 stores the write requests Wb and the data to be written corresponding thereto. Meanwhile, the secondary storage device 30 stores the write requests Wb transmitted from the host computer 10 in the memory 32 thereof and monitors whether or not there is any missing serial number 66 for the respective stored write requests Wb, i.e., whether or not there is any missing write request Wb (901). Upon detection of a missing serial number 66, the secondary storage device 30 transmits a retransmission request for the data to be written to which the missing serial number 66 is attached (902).

Upon receipt of the retransmission request (903), the host computer 10 searches through the data to be written stored therein for the data to be written corresponding to the missing serial number 66 (904) and transmits the searched data and the write request Wb for the data to the secondary storage device 30 (905). Note that the serial number 66 is used herein to identify the data to be written. However, without being limited thereto, it is also satisfactory that the host computer 10 and the secondary storage device 30 can identify the data to be written by use of an identification ID given to the write request Wb.

Upon receipt of the write request Wb (906), the secondary storage device 30 writes the data to be written attached thereto in a position specified by the device address and the start address included in the write request Wb (907). As described above, the missing data is written in the secondary storage device 30 and thus compensated therein.

Note that the above description was made for the mechanism of transmitting the retransmission request to the host computer 10 every time the secondary storage device 30 detects the missing serial number. However, unlike transmitting the retransmission request immediately when the missing is detected, it is also satisfactory that missing serial numbers are listed and accumulated as a table 90 in the memory 32 and a retransmission request for data corresponding to those missing serial numbers is transmitted all at one time when a fixed number of missing serial numbers or more are accumulated in the table 90 or at an appropriate timing such as at fixed time periods or the like.

Incidentally, for reasons such as securing of a sufficient storage area in the host computer 10 and the like, the host computer 10 is operated so as to appropriately delete the data to be written stored therein in some cases. In order to enable the missing data to be compensated in the secondary storage device 30 even in such a case, the multiple data management system of this embodiment includes a mechanism of obtaining data to be written from the primary storage device 20 in the case where the data to be written does not exist in the host computer 10. This mechanism will be described below along with a flowchart shown in FIG. 10.

Figure 10:
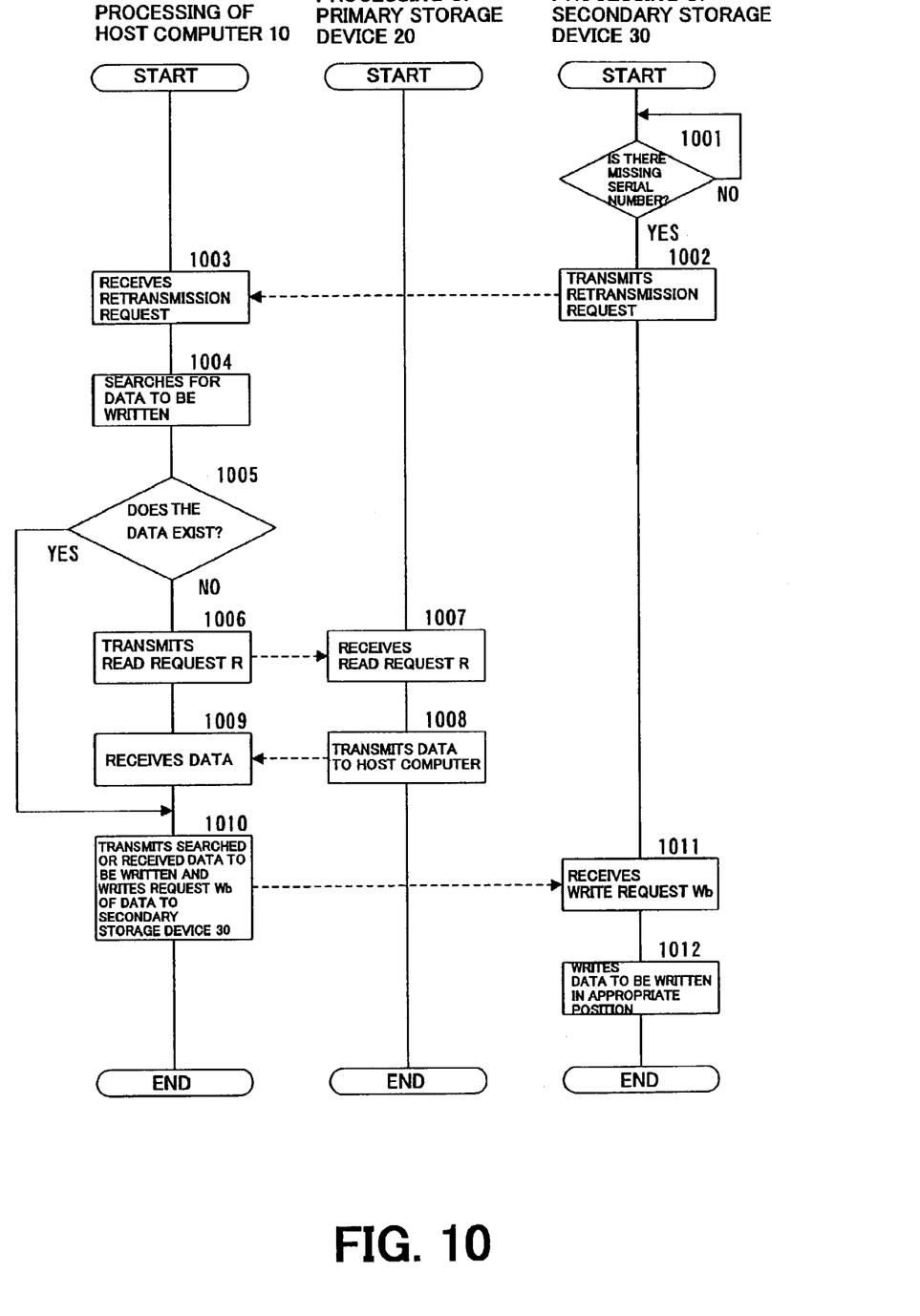
FIG. 10 is a flowchart illustrating processing of compensating for missing data according to another embodiment of the present invention.

Steps 1001 and 1002 in FIG. 10 are similar to steps 901 and 902 in FIG. 9. The host computer 10 receive the retransmission request (1003) and searches for the data to be written corresponding thereto (1004). As a result, when the data to be written does not exist in the host computer 10 (1005), the host computer 10 transmits to the primary storage device 20 a read request R for the data to be written corresponding to the serial number (1006). Note that, in generating this read request R, it is necessary to determine a device address, a start address and a data length on the primary storage device 20 storing the data to be written. Information necessary for this determination, including an identification ID of the data to be written, a position of the data stored in the primary storage device 20 and the like, is managed by the OS.

Upon receipt of the data read request R (1007), the primary storage device 20 reads data stored in a position specified by the device address 82, the start address 83 and the data length 84, all of which are attached to the request, and transmits the data to the host computer 10 (1008).

Upon receipt of the data transmitted from the primary storage device 20 (1009), the host computer 10 transmits a write request Wb having the received data attached thereto as data to be written to the secondary storage device 30 (1010). Upon receipt of the write request Wb (1011), the secondary storage device 30 writes the data attached to the request in a position specified by the device address 62 and the start address 63, which are included in the write request Wb (1012). As described above, missing data is written in the secondary storage device 30.

In the above description, after confirming whether or not the data to be written is left in the host computer 10, the transmission request for the data is transmitted to the primary storage device 20. However, it is also conceivable that the data to be written is obtained directly from the primary storage device 20 without confirming whether or not the data is left in the host computer 10.

<OTHER MODIFICATIONS>

As described above, the multiple data management method of the present invention includes the mechanism of checking whether or not missing data exists by the secondary storage device 30. Thus, processing loads in the host computer 10 and the primary storage device 20 can be reduced and the application programs operated in the host computer 10 are hardly influenced by the processing related to the compensation for the missing data in the secondary storage device 30.

Moreover, in the compensation for the missing data, data to be written is obtained from the primary storage device 20 when the data to be obtained is not left in the host computer 10. Thus, the missing data can be surely compensated in the secondary storage device 30.

Note that the case of "write" in the above description also includes a case of "update", in which existing data is rewritten.

As described above, according to the present embodiment, a new multiple data management method utilizing the Internet as communication media and a computer and storage devices, which are used therefor, can be provided.

Although the preferred embodiments of the present invention has been described in detail, it should be understood that various changes, substitutions and alterations can be made therein without departing from spirit and scope of the inventions as defined by the appended claims.

What is claimed is:

1. A multiple data management method in a system in which a host computer and primary and secondary storage devices are connected as capable of communicating with each other via a network, said primary and secondary storage devices functioning as data storage of said host computer, said method comprising:

transmitting, by said host computer, data to be written and a write request Wa to said primary storage device in writing of data into said primary storage device and transmitting, by said host computer, said data to be written and a write request Wb to said secondary storage device at any point in time after said foregoing transmission;

storing said data to be written by said primary storage device upon receipt of said write request Wa;

storing said data to be written by said secondary storage device upon receipt of said write request Wb; wherein said data transmitted by said host computer to said secondary storage device is not received from said primary storage device by said host computer;

said host computer attaching a serial number to said write request Wb transmitted to said secondary storage device, said serial number being given in an order of transmission of said write requests Wb;

said secondary storage device storing said serial numbers attached to said write requests Wb, monitoring whether or not there is any missing serial number and, when a missing serial number is detected, transmitting to said host computer a data retransmission request of said data to be written corresponding to said missing serial number;

upon receipt of said data retransmission request, said host computer transmitting said data to be written to said secondary storage device corresponding to said missing serial number; and said secondary storage device storing said data to be written upon receipt thereof.

2. A multiple data management method according to claim 1, wherein said network is the Internet.

3. A multiple data management method according to claim 1, further comprising:

said host computer storing said write requests Wb having said serial numbers attached thereto and said data to be written corresponding thereto;

said secondary storage device attaching said missing serial number to said data retransmission request;

said host computer receiving said data retransmission request and transmitting to said secondary storage device said data to be written corresponding to said missing serial number attached to said request; and said secondary storage device storing said data to be written upon receipt thereof.

4. A multiple data management method according to claim 3, further comprising:

said host computer deleting said data to be written stored therein and, when said data to be written corresponding to said serial number attached to said data retransmission request is deleted and does not exist in said host computer, transmitting a transmission request of said data to be written to said primary storage device;

said primary storage device transmitting said data to be written to said host computer upon receipt of said data transmission request;

said host computer transmitting said data to be written to said secondary storage device upon receipt thereof; and said secondary storage device storing said data to be written upon receipt thereof.

5. A multiple data management method according to claim 1, wherein said serial number is a time at which each of said write requests Wb has been transmitted.

6. A computer performing the steps processed by said host computer in a multiple data management method according to claim 1.

7. A storage device performing the steps processed by said primary storage device in a multiple data management method according to claim 1.

8. A storage device performing the steps processed by said secondary storage device in a multiple data management method according to claim 1.

9. A multiple data management method in a system in which a host computer and primary and secondary storage devices are connected as capable of communicating with each other via a network, said primary and secondary storage devices functioning as data storage of said host computer, said method comprising:

transmitting, by said host computer, data to be written and a write request Wa to said primary storage device in writing of data into said primary storage device and transmitting, by said host computer, said data to be written and a write request Wb to said secondary storage device at any point in time after said foregoing transmission;

storing said data to be written by said primary storage device upon receipt of said write request Wa;

storing said data to be written by said secondary storage device upon receipt of said write request Wb; wherein said data transmitted by said host computer to said secondary storage device is not received from said primary storage device by said host computer;

said host computer attaching a serial number to said write request Wb transmitted to said secondary storage device, said serial number being given in an order of said transmission of said write requests Wb;

said secondary storage device storing said serial numbers attached to said write requests Wb, monitoring whether or not there is any missing serial number and, when a missing serial number is detected, transmitting to said host computer a data retransmission request of said data to be written corresponding to said missing serial number;

upon receipt of said data retransmission request, said host computer transmitting a transmission request of said data to be written to said primary storage device;

said primary storage device receiving said data transmission request and transmitting said data to be written to said host computer based on said transmission request;

said host computer transmitting said data to be written to said secondary storage device upon receipt thereof; and said secondary storage device storing said data to be written upon receipt thereof.

10. A computer performing the steps processed by said host computer in a multiple data management method according to claim 9.

11. A storage device performing the steps processed by said primary storage device in a multiple data management method according to claim 9.

12. A storage device performing the steps processed by said secondary storage device in a multiple data management method according to claim 9.

13. A data management method in a system in which a host device is connected with a primary storage device and a secondary storage device, the method comprising:

transmitting, by the host device, data to be written and a write request Wa to the primary storage device in writing of data into the primary storage device;

transmitting, by the host device, the data to be written and a write request Wb to the secondary storage device at any point in time subsequent to transmitting the same data to the primary storage device; wherein the data transmitted by the host device to the secondary storage device is not received from the primary storage device by the host device;

attaching a serial number to the write request Wb transmitted to the secondary storage device, the serial number being given in an order of transmission of the write requests Wb;

receiving, by the host device, a data retransmission request of the data to be written corresponding to a missing serial number when the missing serial number is detected amongst the serial numbers received by the secondary storage device; and upon receipt of the data retransmission request, transmitting the data to be written, by the host computer, to the secondary storage device corresponding to the missing serial number.

14. A data management method according to claim 13, wherein the host device is connected with the primary storage device and the secondary storage device via a network.

15. A data management method according to claim 13, further comprising:

storing, by the host device, the write requests Wb having the serial numbers attached thereto and the data to be written corresponding thereto; and upon receipt of the data retransmission request, transmitting, by the host device, to the secondary storage device the data to be written corresponding to the missing serial number attached to the data retransmission request.

16. A data management method according to claim 15, further comprising:

when the data to be written corresponding to the missing serial number attached to the data retransmission request is deleted and does not exist in the host device, transmitting, by the host device, a transmission request of the data to be written to the primary storage device;

receiving, by the host device from the primary storage device, the data to be written corresponding to the missing serial number; and transmitting, by the host device, the data to be written to the secondary storage device upon receipt thereof from the primary storage device.

17. A data management method according to claim 1, wherein the serial number is a time at which each of the write requests Wb has been transmitted.

18. A data management method in a system in which a host device is connected with a primary storage device and a secondary storage device, the method comprising:

transmitting, by the host device, data to be written and a write request Wa to the primary storage device in writing of data into the primary storage device;

transmitting, by the host device, the data to be written and a write request Wb to the secondary storage device at any point in time subsequent to transmitting the same data to the primary storage device: wherein the data transmitted by the host device to the secondary storage device is not received from the primary storage device by the host device;

attaching a serial number to the write request Wb transmitted to the secondary storage device, the serial number being given in an order of the transmission of the write requests Wb;

receiving, by the host device, a data retransmission request of the data to be written corresponding to a missing serial number when the missing serial number is detected amongst the serial numbers received by the secondary storage device; and upon receipt of the data retransmission request, transmitting, by the host device, a transmission request of the data to be written to the primary storage device;

receiving, by the host device from the primary storage device, the data to be written corresponding to the missing serial number; and transmitting, by the host device, the data to be written to the secondary storage device upon receipt thereof from the primary storage device.

19. A data management method in a system in which a host device is connected with a primary storage device and a secondary storage device, the method comprising:

transmitting, by the host device, data to be written and a write request Wa to the primary storage device in writing of data into the primary storage device;

storing the data to be written in the host device;

transmitting, by the host device, the data to be written which is stored in the host device and a write request Wb to the secondary storage device at any point in time subsequent to transmitting the same data to the primary storage device;

attaching a serial number to the write request Wb transmitted to the secondary storage device, the serial number being given in an order of transmission of the write requests Wb;

receiving, by the host device, a data retransmission request of the data to be written corresponding to a missing serial number when the missing serial number is detected amongst the serial numbers received by the secondary storage device; and upon receipt of the data retransmission request, transmitting the data to be written, by the host computer, to the secondary storage device corresponding to the missing serial number.

20. A data management method in a system in which a host device is connected with a primary storage device and a secondary storage device, the method comprising:

transmitting, by the host device, data to be written and a write request Wa to the primary storage device in writing of data into the primary storage device;

storing the data to be written in the host device;

transmitting, by the host device, the data to be written which is stored in the host device and a write request Wb to the secondary storage device at any point in time subsequent to transmitting the same data to the primary storage device;

attaching a serial number to the write request Wb transmitted to the secondary storage device, the serial number being given in an order of the transmission of the write requests Wb;

receiving, by the host device, a data retransmission request of the data to be written corresponding to a missing serial number when the missing serial number is detected amongst the serial numbers received by the secondary storage device; and upon receipt of the data retransmission request, transmitting, by the host device, a transmission request of the data to be written to the primary storage device;

receiving, by the host device from the primary storage device, the data to be written corresponding to the missing serial number; and transmitting, by the host device, the data to be written to the secondary storage device upon receipt thereof from the primary storage device.

* * * * *